United States Patent
Ryu et al.

(10) Patent No.: US 7,586,975 B2
(45) Date of Patent: Sep. 8, 2009

(54) CODE TRACKING APPARATUS AND METHOD UNDER A MULTI-PATH ENVIRONMENT IN A DS-CDMA COMMUNICATION SYSTEM

(75) Inventors: Dong-Ryeol Ryu, Seoul (KR); Hoon-Geun Song, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 726 days.

(21) Appl. No.: 11/148,171

(22) Filed: Jun. 9, 2005

(65) Prior Publication Data
US 2006/0045171 A1  Mar. 2, 2006

(30) Foreign Application Priority Data
Aug. 30, 2004  (KR) .................. 10-2004-0068565

(51) Int. Cl.
*H04B 1/00*  (2006.01)
(52) U.S. Cl. .................. 375/144; 375/148; 375/147; 375/130; 375/149; 375/136; 455/42; 455/43; 370/441; 370/479
(58) Field of Classification Search .............. 375/148, 375/147, 130, 138, 136, 149
See application file for complete search history.

(56) References Cited

U.S. PATENT DOCUMENTS 6,154,487 A * 11/2000 Murai et al. ............... 375/150
6,628,701 B2 * 9/2003 Yellin ......................... 375/148
7,313,173 B2 * 12/2007 Ando .......................... 375/149
7,397,784 B2 * 7/2008 Ryu et al. ................... 370/345
2002/0037029 A1 * 3/2002 Shimizu et al. ............ 375/148
2006/0098719 A1 * 5/2006 Baltersee et al. ........... 375/148

* cited by examiner

Primary Examiner—Shuwang Liu
Assistant Examiner—Kenneth Lam
(74) Attorney, Agent, or Firm—Roylance, Abrams, Berdo & Goodman, L.L.P.

(57) ABSTRACT

Disclosed is a code tracking apparatus and method under a multi-path environment in a DS-CDMA communication system. Through the steps of calculating fast path energy on a first path signal by removing an interference signal component from the first path signal, the first path signal being faster than an allocated multi-path signal, calculating slow path energy on a second path signal by removing an interference signal component from the second path signal, the second path signal being slower than the allocated multi-path signal, obtaining information regarding timing of the allocated multi-path signal by using the fast path energy and the slow path energy, and receiving the allocated multi-path signal based on the obtained timing information, it is possible to prevent an occurrence of a fat finger phenomenon in which fingers de-modulating multi-path signals having mutually different time delays track the same path, so that it is possible to obtain a time diversity effect, thereby enhancing the reception of a rake receiver.

12 Claims, 12 Drawing Sheets

US 7,586,975 B2

CODE TRACKING APPARATUS AND METHOD UNDER A MULTI-PATH ENVIRONMENT IN A DS-CDMA COMMUNICATION SYSTEM

PRIORITY

This application claims the benefit under 35 U.S.C. 119(a) of an application entitled "Code Tracking Apparatus and Method Under Multi-path Environment in DS-CDMA Communication System" filed in the Korean Intellectual Property Office on Aug. 30, 2004 and assigned Serial No. 2004-68565, the entire contents of which are incorporated herein by reference.

BACKGROUND OF THE INVENTION

1. Field of the Invention

The present invention relates to a code tracking apparatus and method for receiving multi-path signals in a direct sequence code division multiple access (DS/CDMA) system.

2. Description of the Related Art

It is currently simple to predict the saturation of wireless propagation spectrums due to the proliferation of wireless communication services. Accordingly, it is necessary to develop new wireless communication techniques having superior characteristics in view of frequency efficiency. A code division multiple access (CDMA) scheme may be a representative example of these wireless communication techniques.

In the CDMA scheme, several users simultaneously share a wide spectrum. In other words, the users simultaneously transmit signals modulated in a wide spectrum by using a spread spectrum scheme and find a transmit signal of a desired user by using each code (or sequency). A mobile communication system employing the CDMA scheme has superior security as compared with systems employing other multiple access schemes because transmit data are not easily exposed. The CDMA scheme may be divided into a direct sequence CDMA (DS/CDMA) scheme and a frequency hopping CDMA (FH/CDMA) scheme according to schemes of spreading spectrums.

The DS/CDMA scheme refers to a scheme in which a signal to be transmitted is encoded through a user specific pseudo noise (PN) sequence, thereby spreading a spectrum of the signal so as to convert the signal into a signal having a wide spectrum. Generally, the DS/CDMA scheme enables signal transmission through multi-paths. In the DS/CDMA mobile communication system, a multi-path receiver (rake receiver) decodes multi-path signals received through mutually different paths, thereby obtaining a time diversity effect. To this end, the rake receiver has a plurality of fingers. The fingers are assigned multi-path signals having mutually different time delays through different paths, respectively, and signals having been processed in the fingers are combined with each other, thereby enhancing receive quality.

Hereinafter, a description on the multi-path signals will be given in detail with reference to the accompanying drawings.

FIG. 1A illustrates a simulative pattern of multi-paths in a conventional mobile communication system.

As shown in FIG. 1A, a terminal 40 receives multi-path propagation waves such as a direct wave 10 reaching the terminal 40 from a base station 5 without any obstacles, a reflection wave 30 reaching the terminal 40 after being reflected by the walls of buildings, and the like and a diffracted wave 20 reaching the terminal 40 after being diffracted on the roofs of buildings, etc. There is little probability that the terminal 40 is connected to the base station only through the direct wave 10 under general mobile communication environments. In other words, there are plural reflection waves and plural diffracted waves under typical mobile communication environments. These reflection waves and diffracted waves make multi-paths having different delays.

FIG. 1B is a block diagram illustrating a structure of a multi-path receiver receiving and decoding multi-path signals in a DS/CDMA communication system. The multi-path receiver shown in FIG. 1B is called a "rake receiver". A rake receiver of the terminal 40 separately receives multi-path signals having mutually different delay times under the same communication environment as shown in FIG. 1A, thereby improving the reception. To this end, the rake receiver includes a detector 120 for detecting multi-path signals, a plurality of fingers 130, 140, and 150 for receiving the multi-path signals detected by the detector 120 and decoding the multi-path signals, respectively, a combiner 160 for combining the multi-path signals decoded by the fingers 130, 140, and 150 with each other, and a controller 110 for controlling operations and states of the detector 120, the fingers 130, 140, and 150, and the combiner 160.

The fingers 130, 140, and 150 include samplers 132, 142, and 152 for providing samples to be used for de-modulators 136, 146, and 156 and code trackers 134, 144, and 154 from the receive signals, the de-modulators 136, 146, and 156 for de-modulating receive signals in the optimum sample positions, and the code trackers 134, 144, and 154 used for matching synchronization with the multi-path signals. Herein, each of the code trackers 134, 144, and 154 is used for finding the optimum sample position using the multi-path signals so that the strength of the signal power may be maximized.

FIG. 2 is a block diagram illustrating an example of a conventional synchronous code tracker.

A sampler 200 performs sampling with respect to multi-path signals and delivers a sample to a code tracker 250. The code tracker 250 detects by using an auto-correlation characteristic of a scrambling code (or a PN code) a difference between a correlation value of an on-time sample and a late-sample and a correlation value of the on-time sample and an early-time sample and moves the position of an on-time sample toward a sample making a larger correlation value, thereby finding the optimum sample position. Generally, a sample position in time when the difference becomes zero is regarded as the optimum sample position.

Specifically, for the code tracker 250, sample signals transferred from the sampler 200 are de-spread by de-scramblers 260 and 270 using a scrambling code generated through a scrambling code generator 255, accumulated by accumulators 265 and 275, and changed into correlation values.

The de-scrambler 260 and the accumulator 265 form an early sample correlator 210, and the de-scrambler 270 and the accumulator 275 form a late sample correlator 220.

The early sample correlator 210 performs correlation with respect to a sample (i.e., an early-time sample) in a position earlier than the position of an on-time sample to be input to a de-modulator and outputs a first correlation value according to the correlation. The late sample correlator 220 performs correlation with respect to a sample (i.e., a late-time sample) in a position later than the position of an on-time sample to be input to a de-modulator and outputs a second correlation value according to the correlation. In code tracking, an interval between n time' and 'early time' or an interval between 'on time' and 'late time' is usually set to one chip or less, and the interval of 0.5 chip is widely used.

In the embodiment based on FIG. 2, on the assumption that one chip duration is Tc and a delay difference between an on-time sample and a specific sample is Δ, a time difference between the on-time sample and an early-time sample is equal to −0.5 Tc (Δ=−Tc/2) and a time difference between the on-time sample and a late-time sample is equal to 0.5 Tc (Δ=−Tc/2). A correlation value output in the early time is expressed as the first correlation value, R[Δ=−Tc/2], and a correlation value output at the late time is expressed as the second correlation value, R[Δ=Tc/2]. The first correlation value is subtracted from the second correlation value by a subtractor 280. The subtractor 280 detects a timing error 285 due to the correlation difference. Herein, the timing error 285 is equal to 'R[Δ=Tc/2]−R[Δ=−Tc/2]' which is a difference between two correlation values.

The timing error 285 is output as a timing control signal used for finding the optimum sample position through a loop filter 290. The optimum sample position obtained as described above is usually dependent on an envelope of a power delay profile of multi-path signals and is convergent to a time point corresponding to a peak value of the envelope.

FIG. 3 is a block diagram illustrating an example of the conventional asynchronous code tracker. A sampler 300 performs sampling with respect to transmitted multi-path signals and delivers a sample signal to a code tracker 350. The sample signals are de-spread by de-scramblers 360 and 370 using a scrambling code generated through a scrambling code generator 355 and accumulated by accumulator 365 and 375.

The de-scrambler 360 and the accumulator 365 form an early sample correlator 310, and the de-scrambler 370 and the accumulator 375 form a late sample correlator 320. The early sample correlator 310 performs correlation with respect to a sample (i.e., an early-time sample) in a position earlier than the position of an on-time sample and outputs a first correlation value. The late sample correlator 320 performs correlation with respect to a sample (i.e., a late-time sample) in a position later than the position of an on-time sample and outputs a second correlation value according to the correlation. Generally, in code tracking, a time difference between the on-time sample and the early-time sample is equal to −0.5 Tc (Δ=−Tc/2) and a time difference between the on-time sample and the late-time sample is equal to 0.5 Tc (Δ=−Tc/2).

In an asynchronous scheme, there is a phase error component due to asynchronization between a base station and a terminal. Therefore, the code tracker removes phase error components from the correlation values by means of power calculators 367 and 369. The first correlation value and the second correlation value having passed through the power calculators 367 and 369 are subtracted by means of a subtractor 380. The subtractor 380 detects a timing error 385 by using the difference between the correlation values. Accordingly, the timing error 385 corresponds to '{R[Δ=Tc/2]}² − {R[Δ=−Tc/2]}²'.

The timing error 385 is output as a timing control signal used for finding the optimum sample position through a loop filter 390.

FIG. 4 is a graph illustrating an error detection characteristic of the conventional asynchronous code tracker.

In other words, FIG. 4 illustrates a timing error detection characteristic of an asynchronous code tracker having an interval of 1 Tc between a late-time sample and an early-time sample when a single path channel is employed in a DS/CDMA system using a square root raised cosine filter having a roll-off rate of 0.22 as a root raised cosine filter. Herein, the timing error detection characteristic generally has an S curve or shape. When the timing error has a positive value within the range of 0 Tc to 1.5 Tc, the code tracker moves the position of a sample in a positive direction based on the timing error detection characteristic having the S curve, thereby reducing errors. In contrast, when the timing error has a negative value within the range of −1.5 Tc to 0 Tc, the code tracker moves the position of a sample in a negative direction so that the timing error is convergent to a time point of zero.

FIG. 5 is a graph illustrating auto-correlation power for two multi-paths in the conventional code tracker.

The two fingers employing synchronous code trackers under the multi-path environment shown in FIG. 5 are allocated two path signals at t=0 and t=Td corresponding to two paths, respectively. In the code tracker of the first finger for tracking the first path, early correlation power at an early time corresponds to R[Δ=−Tc/2]=R1 [t=−Tc/2]+R2[t=−Tc/2], and late correlation power at a late time corresponds to R[Δ=Tc/2]=R1[t=Tc/2]+R2[t=Tc/2]. Herein, since the value of R2[t=−Tc/2] is equal to zero, the strength of the late correlation power (R[Δ=Tc/2]) is larger than the strength of the early correlation power (R[Δ=−Tc/2]), and the code tracker moves sample timing toward the late time.

In the code tracker of the second finger for tracking the second path, early correlation power at the early time corresponds to R[Δ=−Tc/2]=R1 [t=Td−Tc/2]+R2[t=Td−Tc/2], and late correlation power at the late time corresponds to R[Δ=Tc/2]=R1 [t=Td+Tc/2]+R2[t=Td+Tc/2]. Herein, since the value of R1[t=Td+Tc/2] is equal to zero, the strength of the late correlation power (R[Δ=Tc/2]) is smaller than the strength of the early correlation power (R[Δ=−Tc/2]), and the code tracker moves sample timing toward the early time.

Accordingly, each of the code trackers included in the two fingers fails to track the optimum sample position of each independent path, but tracks a neighboring path. This tendency increases as time delays (Tds) of the two paths approach each other. In this case, since an interference component is added to an early correlation value at an early time and a late correlation value at a late time in the code trackers, the correlation value when the interference component of a neighboring path is added is relatively larger than a correlation value having a little amount of interference. Accordingly, each code tracker tracking each path moves the sample timing toward the neighboring path, and a timing error is convergent not to a time point of zero but to another time point.

It can be understood that the code tracker performing the operation described above based on the conventional technique allows a timing error to be convergent to a time point of 0.5 under the environment in which paths have the same power strength with an interval of one chip.

In the multi-paths, it becomes easier to achieve convergence for each path, as a time delay between neighboring paths becomes larger and a power difference between the neighboring paths becomes smaller. In contrast, as the time delay becomes smaller and the power difference becomes larger, the multi-paths are recognized as a single path, thereby increasing a probability that each code tracker corresponding to each finger may track the same position. Thus, a fat finger phenomenon in that plural fingers track the same path may occur.

The fat finger phenomenon results in the rake receiver not being able to distinguish and receive multi-path signals having mutually different delays, thereby degrading the receive performance of the rake receiver.

SUMMARY OF THE INVENTION

Accordingly, the present invention has been made to solve the above-mentioned problems occurring in the prior art, and it is an object of the present invention to provide a code tracking apparatus and method in a direct sequence/code division multiple access (DS/CDMA) communication system.

It is another object of the present invention to provide an apparatus and method for detecting a timing error in a code tracker, which can prevent a fat finger phenomenon caused when a time delay difference is small between multi-paths.

It is another object of the present invention to provide an apparatus and method for distinguishing and receiving multi-path signals having mutually different delays in a rake receiver, thereby improving receive performance of the rake receiver.

To accomplish the above objects, there is provided an apparatus and method for receiving multi-path signals in a communication system. The method comprises calculating fast path energy on a first path signal by removing an interference signal component from the first path signal, the first path signal being faster than an allocated multi-path signal, calculating slow path energy on a second path signal by removing an interference signal component from the second path signal, the second path signal being slower than the allocated multi-path signal, obtaining information regarding timing of the allocated multi-path signal by using the fast path energy and the slow path energy, and receiving the allocated multi-path signal based on the obtained timing information.

BRIEF DESCRIPTION OF THE DRAWINGS

The above and other objects, features and advantages of the present invention will be more apparent from the following detailed description taken in conjunction with the accompanying drawings, in which.

Throughout the drawings, the same or similar elements are designated by the same reference numeral or character.

DETAILED DESCRIPTION OF EXEMPLARY EMBODIMENTS

Hereinafter, embodiments of the present invention will be described in detail with reference to the accompanying drawings. In the following description of the present invention, a detailed description of known functions and configurations incorporated herein will be omitted for conciseness. In addition, the following terminologies are defined based on functions performed in the present invention. Herein, the terminology definition may vary according to common usage or intention of a user or an operator. In addition, the terminology definition must be achieved on the basis of the whole content of the specification.

The present invention is designed in order to overcome a fat finger phenomenon caused when multi-path signals are received in a direct sequence code division multiple access (DS/CDMA) system. In the present invention, although a time interval and a delay time are expressed as '1 Tc' and '1 chip', respectively, they may be expressed as other predetermined values.

Figure 1A:
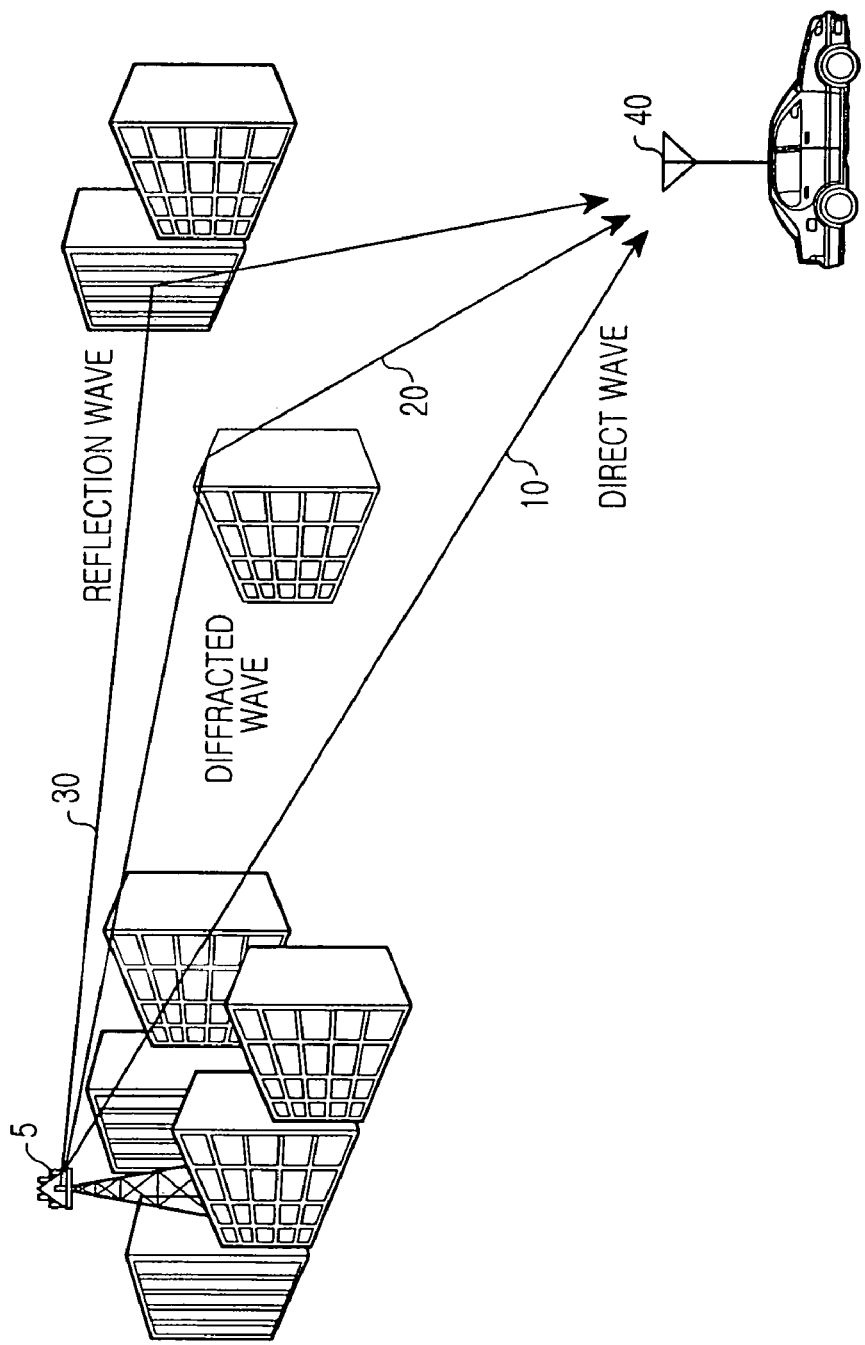
FIG. 1A illustrates a simulative pattern of multi-paths in a conventional mobile communication system.
Figure 1B:
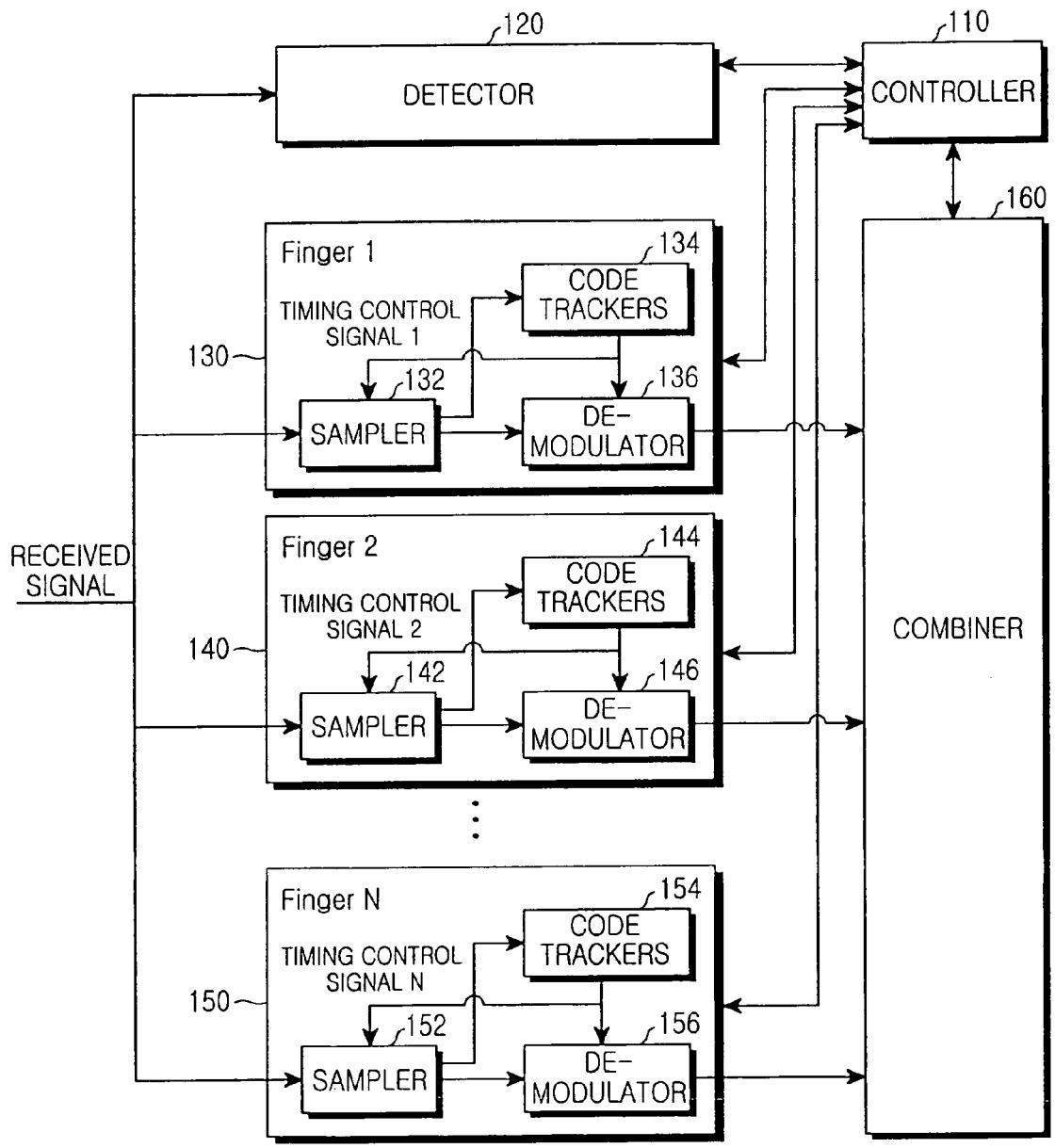
FIG. 1B is a block diagram illustrating a structure of a multi-path receiver receiving and decoding multi-path signals in the conventional mobile communication system.
Figure 2:
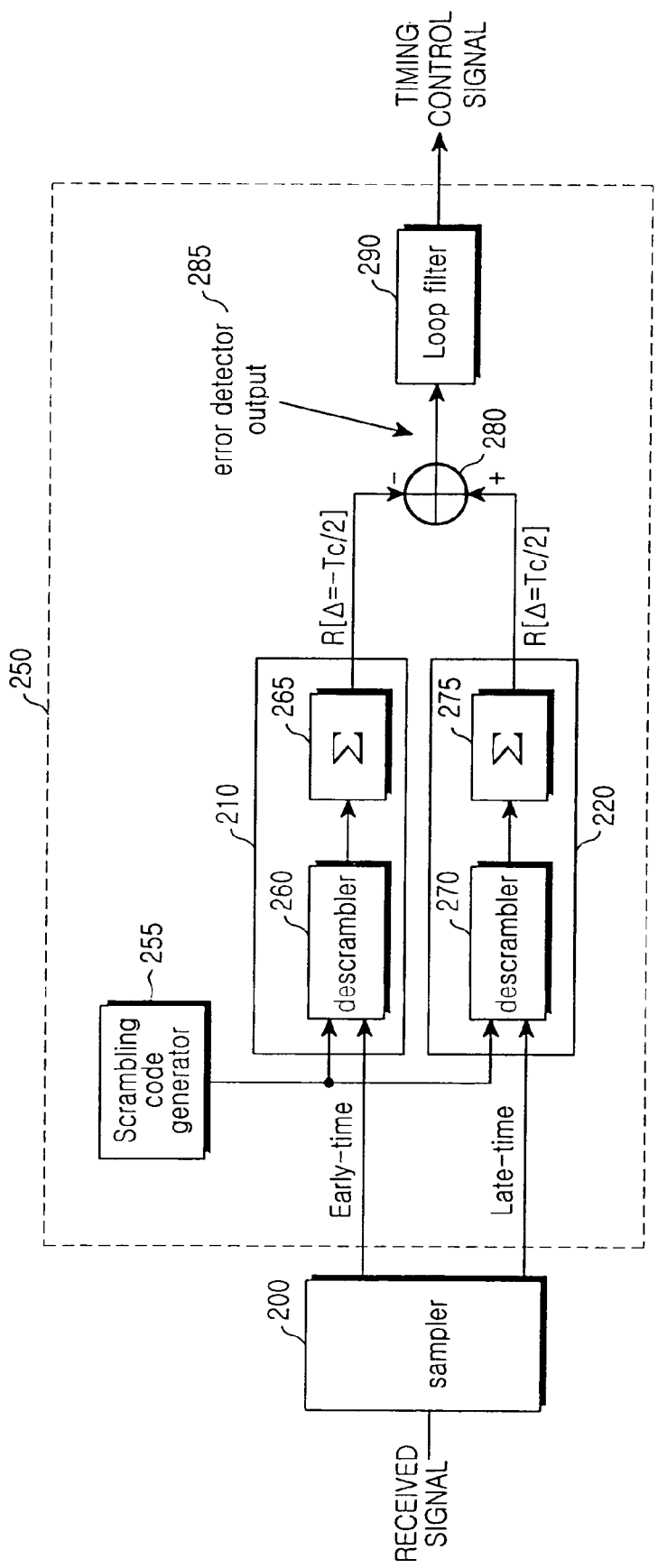
FIG. 2 is a block diagram illustrating an example of the conventional synchronous code tracker.
Figure 3:
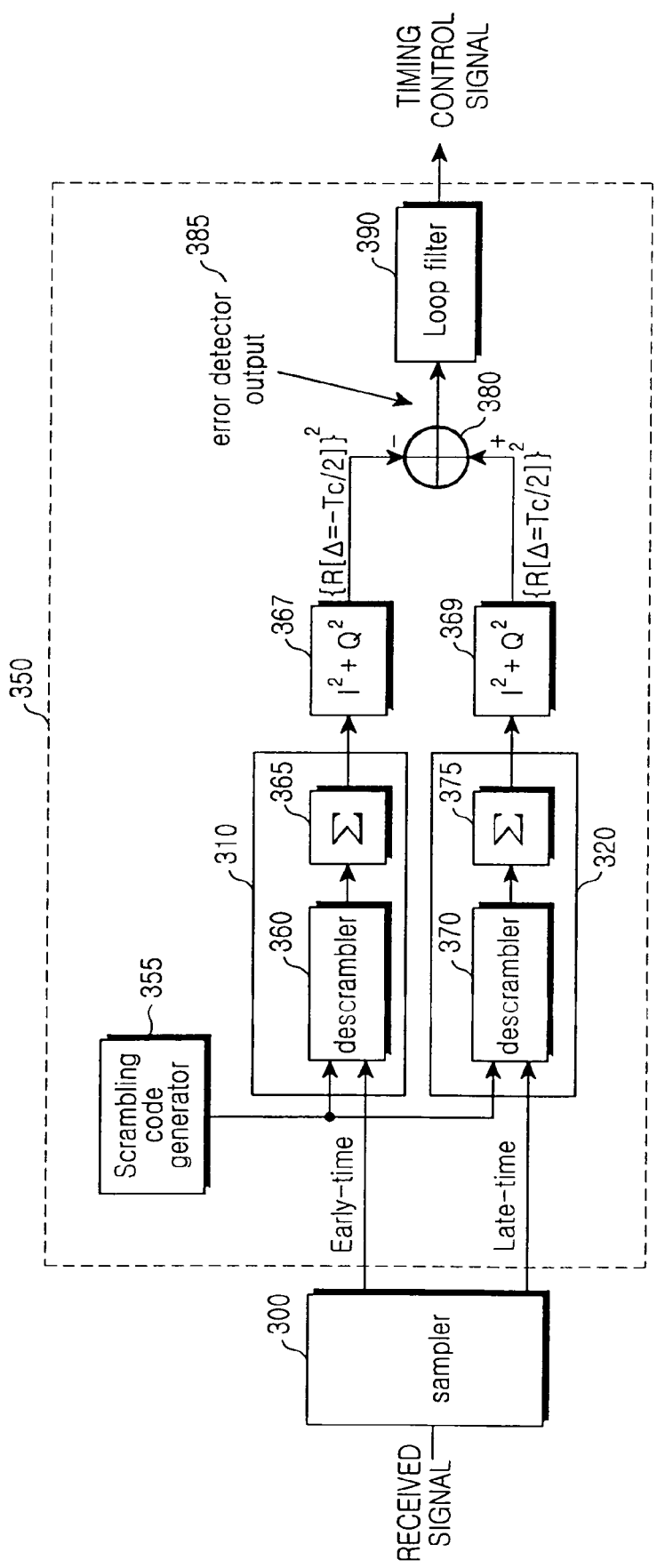
FIG. 3 is a block diagram illustrating an example of the conventional asynchronous code tracker.
Figure 4:
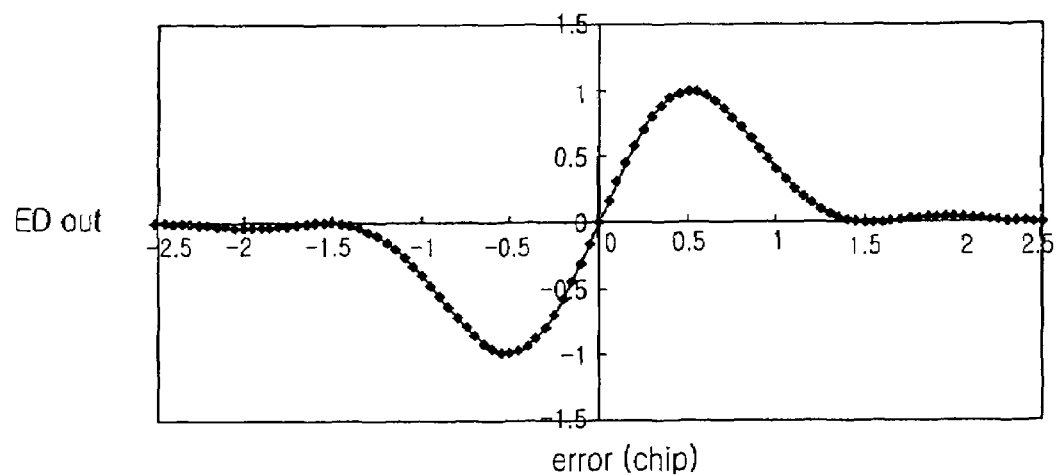
FIG. 4 is a graph illustrating an error detection characteristic of the conventional asynchronous code tracker.
Figure 5:
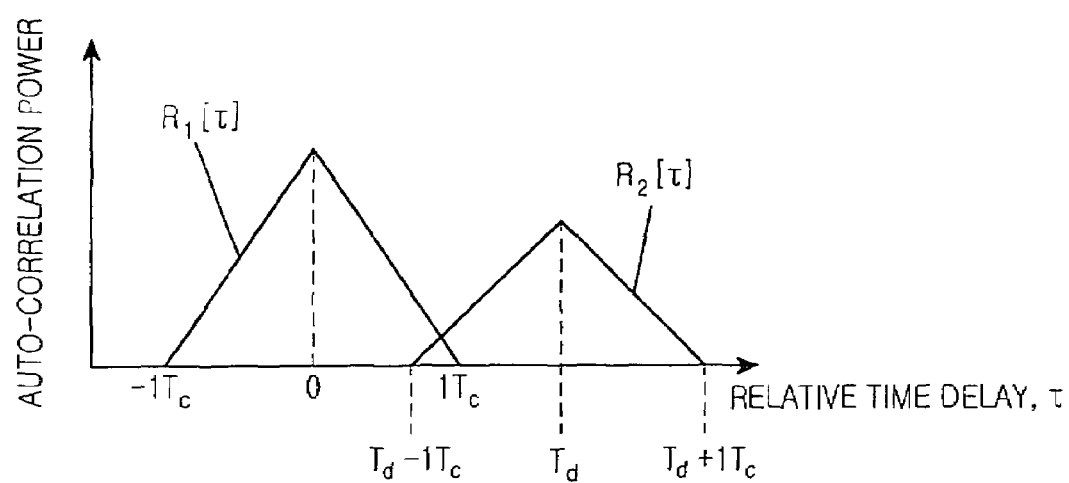
FIG. 5 is a graph illustrating auto-correlation power for two multi-paths in the conventional code tracker.
Figure 6:
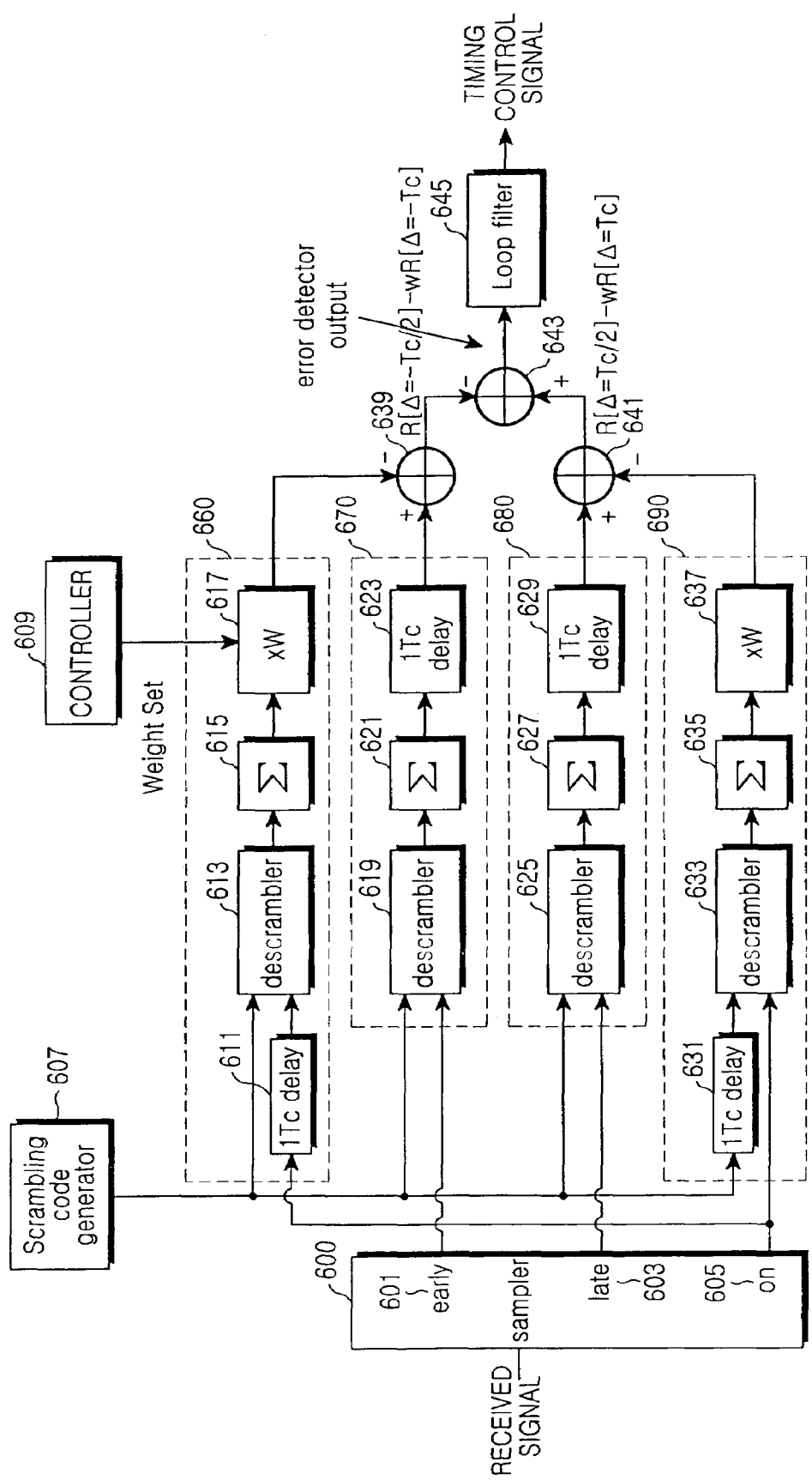
FIG. 6 is a block diagram illustrating a structure of a synchronous code tracker according to an embodiment of the present invention.

FIG. 6 is a block diagram illustrating a structure of a synchronous code tracker according to a first embodiment of the present invention.

A received signal is processed through sampling in a sampler 600. A scrambling code generator 607 generates a scrambling code so as to deliver the scrambling code to an early-time correlator 670, a late-time correlator 680, a '−1 Tc-time' correlator 660, and a '+1 Tc-time' correlator 690.

The early-time correlator 670 comprising a de-scrambler 619, an accumulator 621, and one chip delayer 623 correlates an early-time sample 601 input from the sampler 600 with the scramble code delivered from the scrambling code generator 607 by means of the de-scrambler 619. An early correlation value is delayed by 1 Tc by means of the delayer 623 and becomes $R[\Delta=-Tc/2]$ (the delayed early correlation value). Herein, the correlation operation includes a de-spreading process and an accumulation process for the scrambling code.

The late-time correlator 680 comprising a de-scrambler 625, an accumulator 627, and one chip delayer 629 correlates a late-time sample 603 input from the sampler 600 with the scramble code delivered from the scrambling code generator 607 by means of the de-scrambler 625. A late correlation value is delayed by 1 Tc by means of the delayer 629 and becomes $R[\Delta=Tc/2]$ (the delayed late correlation value).

The '−1 Tc-time' correlator 660 comprising a delayer 611, a de-scrambler 613, an accumulator 615, and a weight multiplier 617 delays an on-time sample 605 input from the sampler 600 by 1 Tc by means of the delayer 611 and then correlates the delayed on-time sample with the scrambling code delivered from the scrambling code generator 607 by means of the de-scrambler 613, thereby finding a correlation value $R[\Delta=-Tc]$. The weight multiplier 617 multiplies the correlation value by a weighting factor (w) delivered from a control unit 609, thereby outputting $wR[\Delta=-Tc]$.

The '+1 Tc-time' correlator 690 comprising a delayer 631, a de-scrambler 633, an accumulator 635, and a weight multiplier 637 delays the scrambling code input from the scrambling code generator 607 by 1 Tc by means of the delayer 631 and then finds a correlation value $R[\Delta=Tc]$ using the on-time sample 605 delivered from the sampler 600 by means of the de-scrambler 633. The weight multiplier 637 multiplies the correlation value by the weighting factor (w) delivered from the control unit 609, thereby outputting $wR[\Delta=Tc]$.

The control unit 609 determines a weighting factor multiplied by a '+1 Tc-time' correlation value and a '−1 Tc-time' correlation value. The weighting factor is set based on an auto-correlation characteristic of a signal in such a manner that an interference component of a neighboring signal caused by a delay difference between multi-paths is removed. For example, on the assumption that the auto-correlation characteristic approaches a characteristic of a triangle wave and a neighboring path is positioned within the range of time of +1 Tc to time of +2 Tc, the weighting factor may be set to 0.5 (i.e., w=0.5) because the amount of interference of the neighboring path exerting an influence on a correlation value at time of +0.5 Tc measured in the code tracker corresponds to a half of a correlation value measured at time of +1 Tc. Values generated from the correlators 660, 670, 680, and 690 are delivered to subtractors 641 and 639. The subtractor 641 subtracts an output of the +1 Tc-time correlator 690 from the delayed late correlation value, and the subtractor 639 subtracts an output of the −1 Tc time correlator 613 from the delayed early correlation value.

A first subtraction value, $R[\Delta=-Tc/2]-wR[\Delta=-Tc]$, output from the subtractor 639 and a second subtraction value, $R[\Delta=Tc/2]-wR[\Delta=Tc]$, output from the subtractor 641 are delivered to a timing error detector 643. The timing error detector 643 subtracts the first subtraction value from the second subtraction value so as to detect a timing error. A loop filter 645 generates a timing error control signal using the timing error.

Herein, the timing error detector 643 outputs the timing error, $(R[\Delta=Tc/2]-wR[\Delta=Tc])-(R[\Delta=-Tc/2]-wR[\Delta=-Tc])$, by calculating ('the output of the late-time correlator'−w× 'the output of the +1 Tc-time correlator')−(the output of the early-time correlator−w×'the output of the −1 Tc-time correlator').

The '+1 Tc-time' correlator 690 and the '−1 Tc-time' correlator 660 measure interference in neighboring paths. Generally, this is based on the fact that an auto-correlation characteristic of a scrambling code is approximate to 0 after a time of 1 Tc. In other words, the code tracker shown in FIG. 6 regards a first correlation value obtained at time after the elapse of −1 Tc based on current time as an interference component of a path signal having an early phase and subtracts a result value obtained by multiplying the first correlation value by a weighting factor from an early correlation value at early time, thereby removing an interference component due to an early path which can be added in the early correlation. Similarly, the code tracker regards a second correlation value obtained at time after the elapse of +1 Tc based on current time as an interference component of a path signal having a late phase and subtracts a result value obtained by multiplying the second correlation value by a weighting factor from a late correlation value, thereby removing an interference component due to a late path which can be added in the late correlation. Herein, the waiting factor, which may be set in the control unit 609, is used for finding an interference amount estimated at time of +0.5 Tc and time of −0.5 Tc compared with an interference amount at time of +1 Tc and time of −1 Tc. In the embodiment, the waiting factor may be set to a value within the range of 0 to 2.

In other words, fast path energy is calculated for a first path signal by removing an interference signal component from the first path signal. The first path signal is faster than an allocated multi-path signal. The slow path energy is calculated for a second path signal by removing an interference signal component from the second path signal. The second path signal is slower than the allocated multi-path signal. Information regarding the timing of the allocated multi-path signal is obtained by using the fast path energy and the slow path energy. The allocated multi-path signal is then received based on the obtained timing information.

Figure 7:
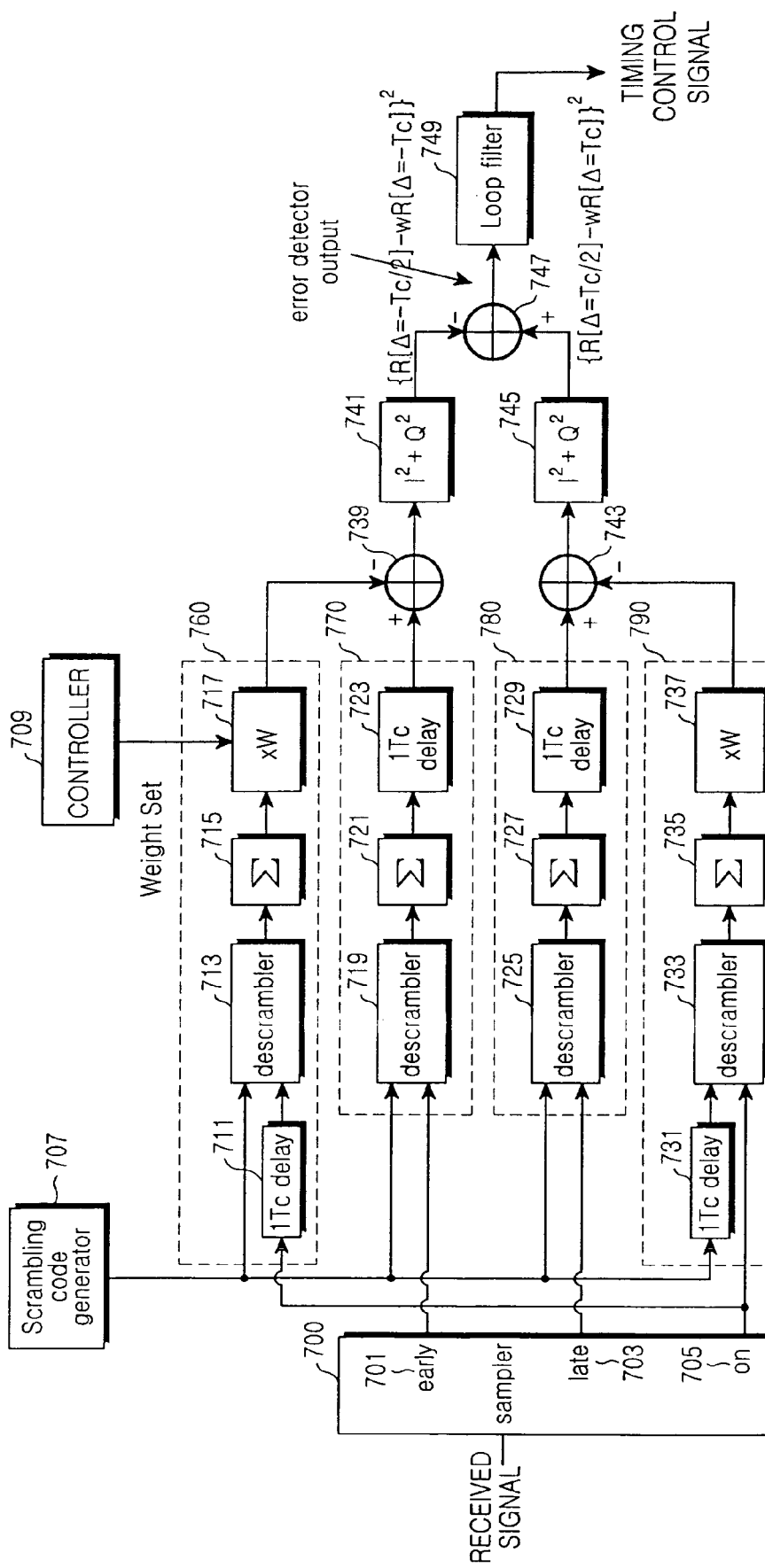
FIG. 7 is a block diagram illustrating a structure of an asynchronous code tracker according to an embodiment of the present invention.

FIG. 7 is a block diagram illustrating a structure of an asynchronous code tracker according to the first embodiment of the present invention.

A received signal is processed through sampling in a sampler 700. A scrambling code generator 707 generates a scrambling code so as to deliver the scrambling code to an early-time correlator 770, a late-time correlator 780, a '−1 Tc'-time correlator 760, and a '+1 Tc-time' correlator 790.

The early-time correlator 770 comprising a de-scrambler 719, an accumulator 721, and a delayer 723 correlates an early-time sample 701 input from the sampler 700 with the scramble code delivered from the scrambling code generator 707 by means of the de-scrambler 719. An early correlation value is delayed by 1 Tc by means of the delayer 723 and becomes $R[\Delta=-Tc/2]$ (the delayed early correlation value). Herein, the correlation operation comprises a de-spreading process and an accumulation process for the scrambling code.

The late-time correlator 780 comprising a de-scrambler 725, an accumulator 727, and a delayer 729 correlates a late-time sample 703 input from the sampler 700 with the scramble code delivered from the scrambling code generator 707. A late correlation value is delayed by 1 Tc by means of the delayer 729 and becomes $R[\Delta=Tc/2]$ (the delayed late correlation value).

The '−1 Tc-time' correlator 760 comprising a delayer 711, a de-scrambler 713, an accumulator 715, and a weight multiplier 717 delays an on-time sample 705 input from the sampler 700 by 1 Tc by means of the delayer 711 and then correlates the delayed on-time sample with the scrambling code delivered from the scrambling code generator 707, thereby finding a correlation value $R[\Delta=-Tc]$. The weight multiplier 717 multiplies the correlation value by a weighting factor (W) delivered from a control unit 709, thereby outputting $wR[\Delta=-Tc]$.

The '+1 Tc-time' correlator 790 comprising a delayer 731, a de-scrambler 733, an accumulator 735, and a weight multiplier 737 delays the scrambling code input from the scrambling code generator 707 by 1 Tc by means of the delayer 731 and then finds a correlation value $R[\Delta=Tc]$ using the on-time sample 705 delivered from the sampler 700 by means of the de-scrambler 733. The weight multiplier 737 multiplies the correlation value by the weighting factor (W) delivered from the control unit 709, thereby outputting $wR[\Delta=Tc]$.

Values output from the correlators 760, 770, 780, and 790 are delivered to subtractors 743 and 739. The subtractor 743 subtracts the output of the +1 Tc-time correlator 790 from the output of the late-time correlator 780. The subtractor 739 subtracts the output of the −1 Tc-time correlator 760 from the delayed early correlation value.

In an asynchronous scheme, power calculators 741 and 745 remove phase error components from outputs of the subtractors 739 and 743 because the phase error components exist due to asynchronization of a base station and a receiver. The power calculators 741 and 745 output a first correction value, $\{R[\Delta=-Tc/2]-wR[\Delta=-Tc]\}$, and a second correction value, $\{R[\Delta=Tc/2]-wR[\Delta=1\ Tc]\}$ to a timing error detector 747 (finding a difference value between the first correction value and the second correction value), respectively. The timing error detector 747 detects a timing error by subtracting the first correction value from the second correction value. A loop filter 749 generates a timing error control signal using the input timing error.

Herein, the timing error detector 747 outputs the timing error, $(R[\Delta=Tc/2]-wR[\Delta=Tc])^2-(R[\Delta=-Tc/2]-wR[\Delta=-Tc])^2$, by calculating ('the output of the late-time correlator'− w×'the output of the +1 Tc-time correlator')² –(the output of the early-time correlator–w×'the output of the –1 Tc-time correlator')².

Figure 8:
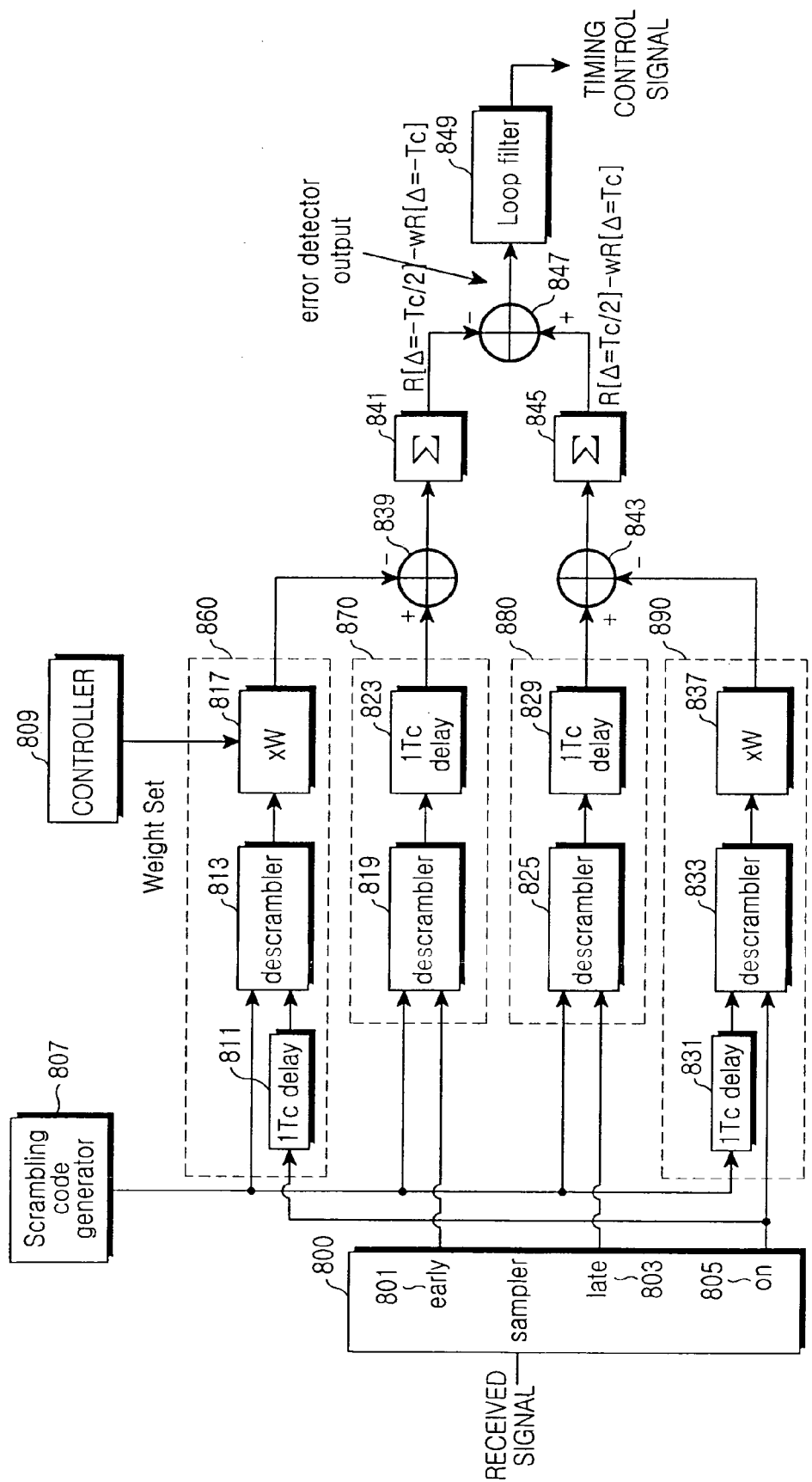
FIG. 8 is a block diagram illustrating a structure of a synchronous code tracker according to an embodiment of the present invention.

FIG. 8 is a block diagram illustrating a structure of a synchronous code tracker according to a second embodiment of the present invention.

The second embodiment is realized by changing calculation sequences of the first embodiment. In other words, an accumulation process is performed after subtraction, thereby reducing the number of accumulators required for correlation.

A received signal is processed through sampling in a sampler 800. A scrambling code generator 807 generates a scrambling code at every chip so as to deliver the scrambling code to an early-time correlator 819, a late-time correlator 825, a '–1 Tc'-time correlator 813, and a '+1 Tc-time' correlator 833.

The early-time correlator 870 comprising a de-scrambler 819 and a delayer 623 de-scrambles an early-time sample input from the sampler 800 using the scramble code delivered from the scrambling code generator 807 by means of the de-scrambler 819. The de-scrambled signal is delayed by 1 Tc by means of the delayer 823.

The late-time correlator 880 comprising a de-scrambler 825 and a delayer 829 de-scrambles a late-time sample input from the sampler 800 using the scramble code delivered from the scrambling code generator 807 by means of the de-scrambler 825. The de-scrambled signal is delayed by 1 Tc by means of the delayer 829.

The '–1 Tc-time' correlator 860 comprising a delayer 811, a de-scrambler 813, and a weight multiplier 817 delays an on-time sample input from the sampler 800 by 1 Tc by means of the delayer 811 and then de-scrambles the delayed on-time sample with the scrambling code delivered from the scrambling code generator 807 by means of the de-scrambler 813. The weight multiplier 817 multiplies the de-scrambled signal by a weighting factor (w).

The '+1 Tc-time' correlator 890 comprising a delayer 831, a de-scrambler 833, and a weight multiplier 837 delays the scrambling code received from the scrambling code generator 807 by 1 Tc by means of the delayer 831 and then de-scrambles the on-time sample received from the sampler 800 using the delayed scrambling code by means of the de-scrambler 833. The weight multiplier 837 multiplies the de-scrambled signal by a weighting factor (w).

The waiting factors (w) multiplied by output values of the +1 Tc time de-scrambler 813 and the –1 Tc time de-scrambler 833, respectively, are set by the control unit 809.

The weight multipliers 817 and 837 and the delayers 823 and 829 deliver their values to subtractors 843 and 839. The subtractor 843 subtracts the output of the weight multiplier 837 from the output of the delayer 829, and the subtractor 839 subtracts the output of the weight multiplier 817 from the output of the delayer 823.

Accumulators 841 and 845 accumulate subtraction values from the subtractors 839 and 843.

A first subtraction value, $R[\Delta=-Tc/2]-wR[\Delta=-Tc]$, output from the subtractor 839 through the accumulator 841 and a second subtraction value, $R[\Delta=Tc/2]-wR[\Delta=Tc]$, output from the subtractor 841 through the accumulator 845 are delivered to a timing error detector 847. The timing error detector 847 subtracts the first subtraction value from the second subtraction value so as to detect a timing error. A loop filter 849 generates a timing error control signal using the timing error.

Figure 9:
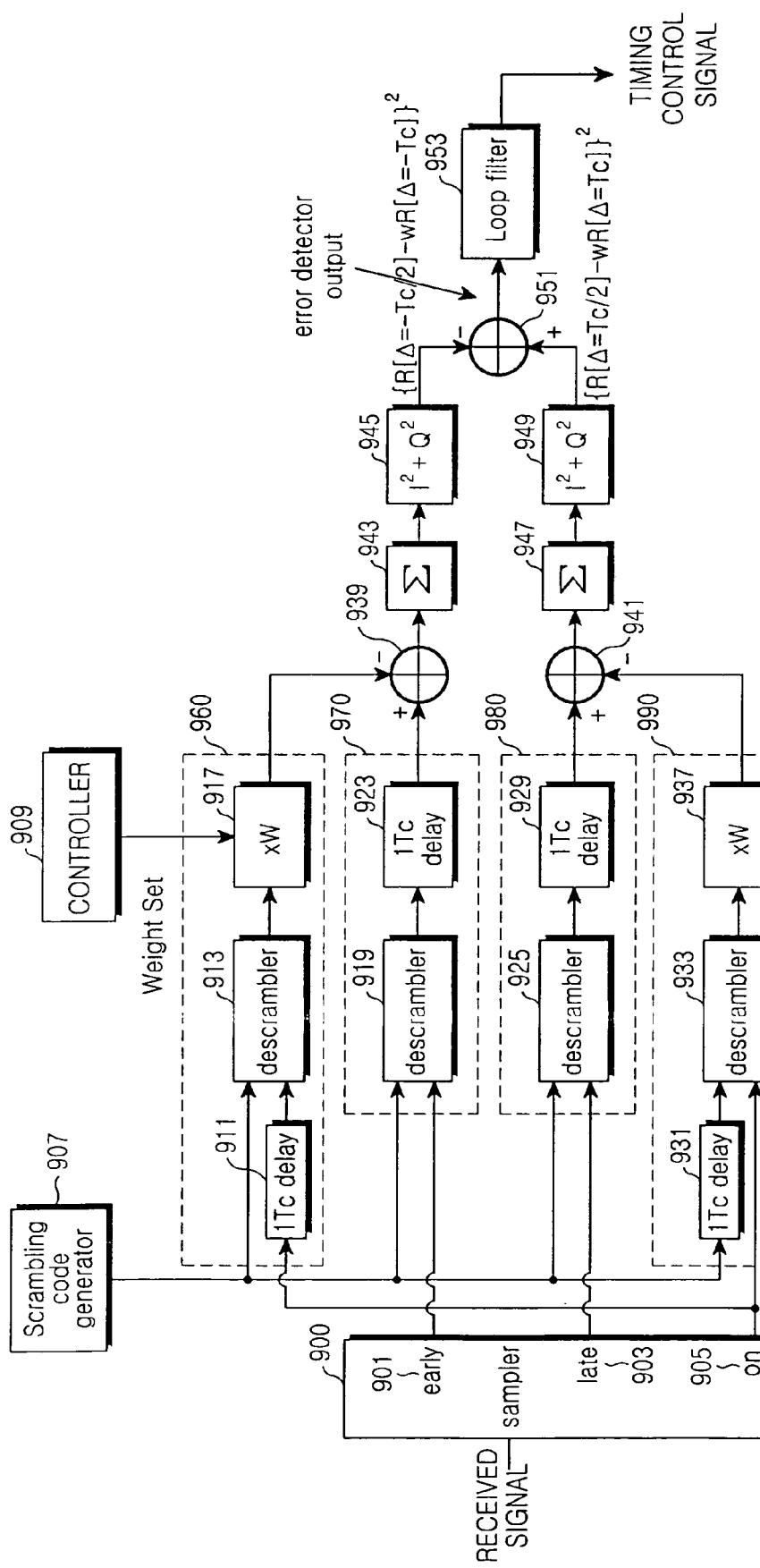
FIG. 9 is a block diagram illustrating a structure of an asynchronous code tracker according to an embodiment of the present invention.

FIG. 9 is a block diagram illustrating a structure of an asynchronous code tracker according to the second embodiment of the present invention.

A received signal is processed through sampling in a sampler 900. A scrambling code generator 907 generates a scrambling code so as to deliver the scrambling code to an early-time correlator 919, a late-time correlator 925, a '–1 Tc'-time correlator 913, and '+1 Tc-time' correlator 933.

The early-time correlator 970 comprising a de-scrambler 919 and a delayer 923 de-scrambles an early-time sample input from the sampler 900 using the scramble code delivered from the scrambling code generator 907 by means of the de-scrambler 919. The de-scrambled signal is delayed by 1 Tc by means of the delayer 923.

The late-time correlator 980 comprising a de-scrambler 925 and a delayer 929 de-scrambles a late-time sample input from the sampler 900 using the scramble code delivered from the scrambling code generator 907 by means of the de-scrambler 925. The de-scrambled signal is delayed by 1 Tc by means of the delayer 929.

The '–1 Tc-time' correlator 960 comprising a delayer 911, a de-scrambler 913, and a weight multiplier 917 delays an on-time sample input from the sampler 900 by 1 Tc by means of the delayer 911 and then de-scrambles the delayed on-time sample with the scrambling code delivered from the scrambling code generator 907 by means of the de-scrambler 913. The weight multiplier 917 multiplies the de-scrambled signal by a weighting factor (w).

The '+1 Tc-time' correlator 990 comprising a delayer 931, a de-scrambler 933, and a weight multiplier 937 delays the scrambling code received from the scrambling code generator 907 by 1 Tc by means of the delayer 931 and then de-scrambles the on-time sample received from the sampler 900 using the delayed scrambling code by means of the de-scrambler 933. The weight multiplier 937 multiplies the de-scrambled signal by a weighting factor (w).

The weight multipliers 917 and 937 and the delayers 923 and 929 deliver their values to subtractors 941 and 939. The subtractor 941 subtracts the output of the weight multiplier 937 from the output of the delayer 929, and the subtractor 939 subtracts the output of the weight multiplier 917 from the output of the delayer 923.

Accumulators 943 and 947 accumulate subtraction values from the subtractors 939 and 941. Since output signals having a first subtraction value, $R[\Delta=-Tc/2]-wR[\Delta=-Tc]^2$, output from the subtractor 939 through the accumulator 943 and a second subtraction value, $R[\Delta=Tc/2]-wR[\Delta=Tc]$, output from the subtractor 941 through the accumulator 947 are asynchronous with signals of a base station, phase error components exist. Accordingly, the power calculators 945 and 949 remove phase error components from the accumulated values. The power calculators 945 and 949 output a first correction value, $\{R[\Delta=-Tc/2]-wR[\Delta=-Tc]\}2$, and a second correction value, $\{R[\Delta=Tc/2]-wR[\Delta=Tc]\}2$ to a timing error detector 951, respectively. The timing error detector 951 detects a timing error by subtracting the first correction value from the second correction value. A loop filter 953 generates a timing error control signal using the input timing error.

FIGS. 10 to 13 are graphs illustrating a multi-path environment according to delay differences between paths on the assumption that an auto-correlation function is expressed as a triangle wave according to embodiments of the present invention.

Figure 10:
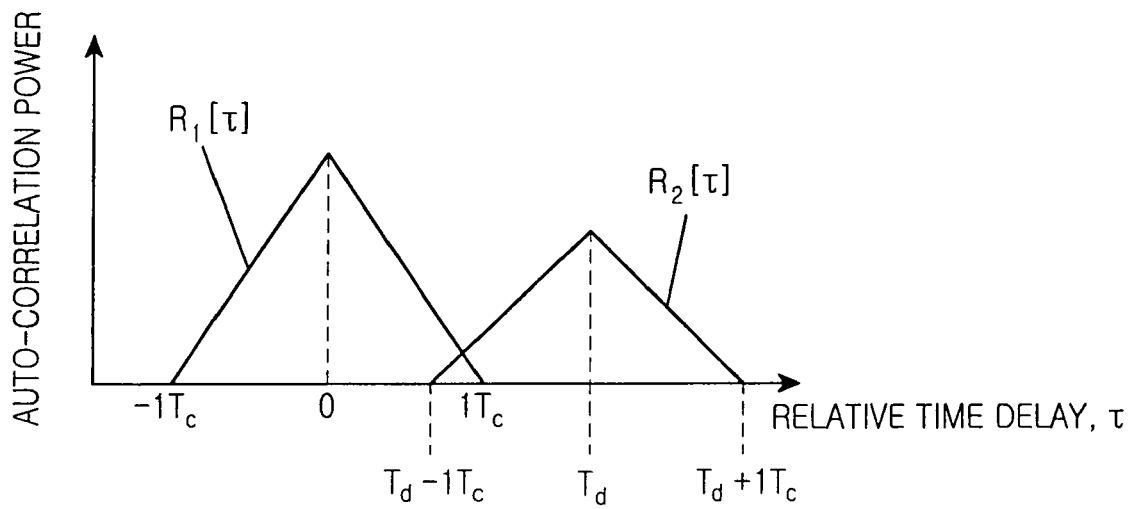
FIGS. 10 to 13 are graphs illustrating a multi-path environment according to delay differences between paths according to embodiments of the present invention.

Under the condition in which a time delay difference Td between paths is at least 1.5 Tc as shown in FIG. 10, correlation values $R[\Delta=-Tc/2]$ and $R[\Delta=Tc/2]$ for the paths have no interference components due to neighboring paths. In this case, a weighting factor w is set to zero.

Figure 11:
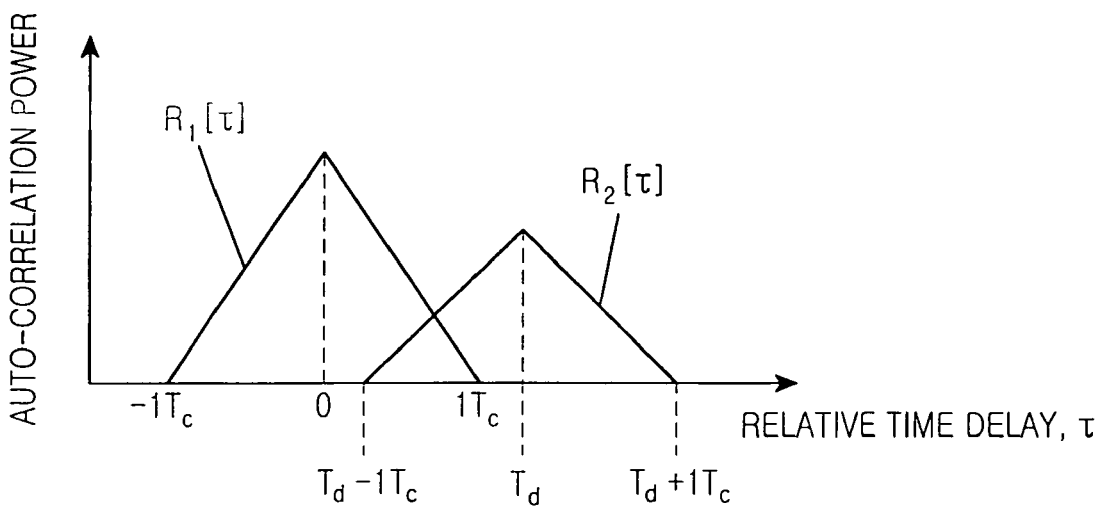

Under the condition in which a time delay difference Td between paths satisfies '1 Tc 5=Td<1.5 Tc' as shown in FIG. 11, although a correlation value for a first path, $R[\Delta=-Tc/2]$, has no interference component due to a second path, a correlation value for the second path, $R[\Delta=Tc/2]$, comprises an interference component due to the first path, and an amount of the interference corresponds to a half of $R[\Delta=Tc]$. In this case, a weighting factor is set to 0.5.

Figure 12:
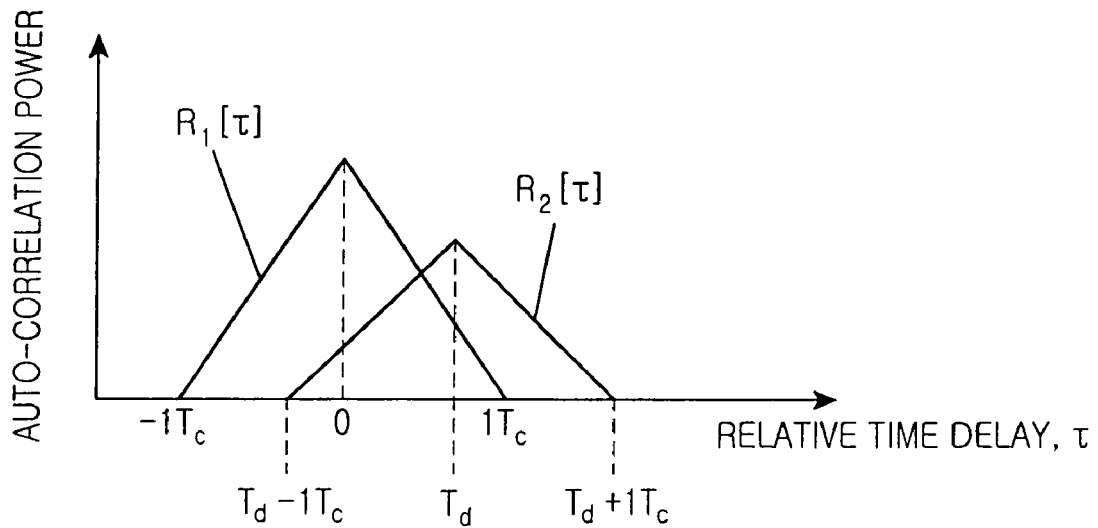

Under the condition in which a time delay difference Td between paths satisfies '0.5 Tc=Td<1 Tc' as shown in FIG. 12, although a correlation value for a first path, $R[\Delta=-Tc/2]$, has no interference component due to a second path, a correlation value for the second path, $R[\Delta=Tc/2]$, comprises an interference component due to the first path, and an amount of the interference corresponds to a value within the range of 0.5 times to two times of $R[\Delta=Tc]$. Accordingly, a weighting factor may be set to a value within the range of 0.5 to 2. For example, when Td=0.75 Tc, w is set to 1.

Figure 13:
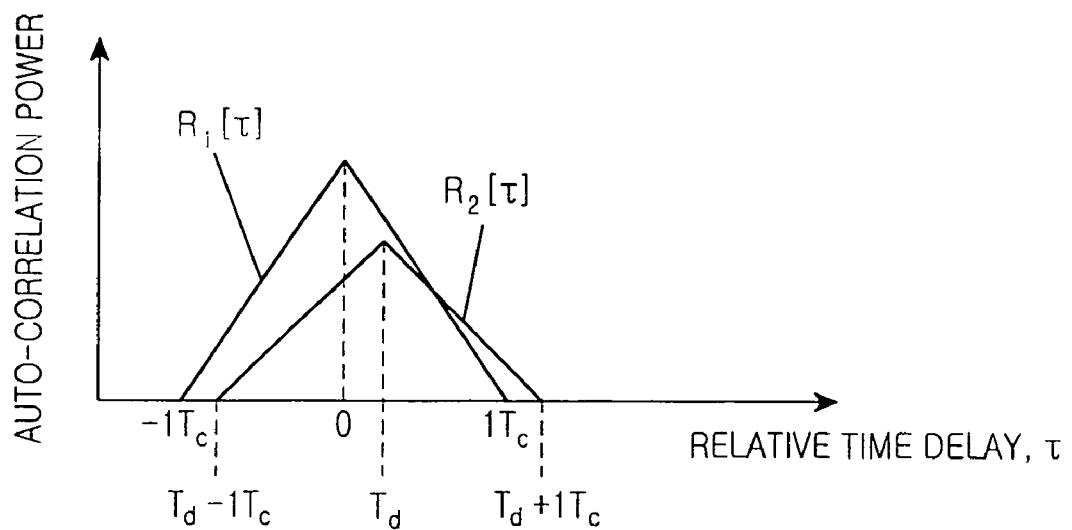

Under the condition in which a time delay difference Td between paths satisfies '0 Tc=Td<0.5 Tc' as shown in FIG. 13, although a correlation value for a first path, $R[\Delta=-Tc/2]$, has no interference component due to a second path, a correlation value for the second path, $R[\Delta=Tc/2]$, comprises an interference component due to the first path, and an amount of the interference corresponds to two times of $R[\Delta=Tc]$. In this case, a weighting factor w is set to 2.

Figure 14:
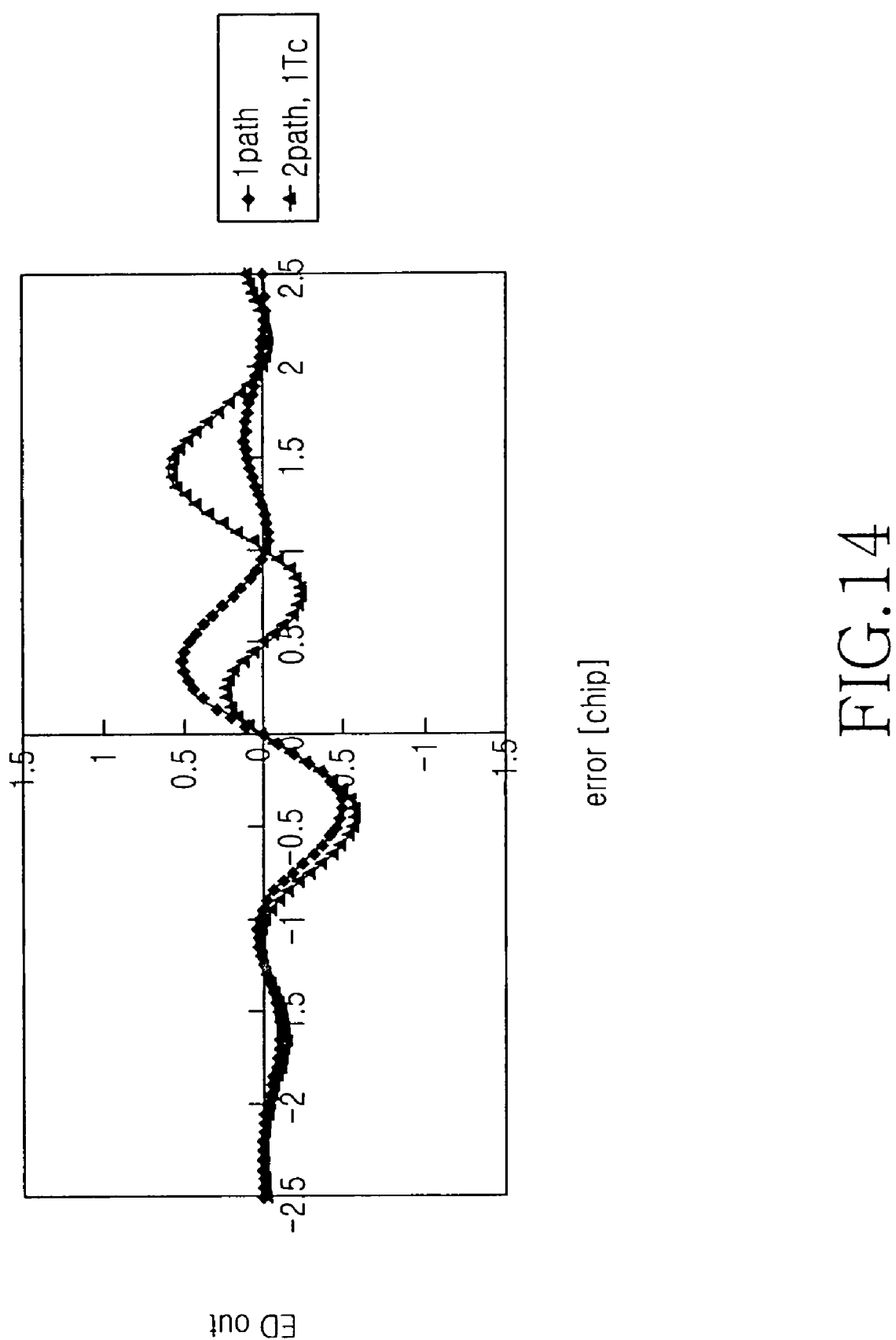
FIG. 14 is a graph illustrating an S curve of an asynchronous code tracker according to an embodiment of the present invention.

FIG. 14 is a graph illustrating an S curve of an asynchronous code tracker according to the an embodiment of the present invention under the environment in which there are two equivalent paths having an interval of one chip and a single path channel in a CDMA system using a square root raised cosine filter having a roll-off rate of 0.22 as a root raised cosine filter. Herein, a weighting factor is set to 0.5 for the purpose of hardware realization for this embodiment of the present invention.

It can be understood from FIG. 14 that the code tracker can distinguish paths because a timing error rate becomes '0' at time of a timing error '0'.

Hereinafter, an effect by one representative embodiment of the invention disclosed herein will be briefly described.

According to the present invention, it is possible to prevent an occurrence of a fat finger phenomenon in which fingers de-modulating multi-path signals having mutually different time delays track the same path in a DS/CDMA system. Therefore, it is possible to obtain a time diversity effect, thereby enhancing receive quality of a rake receiver.

While the invention has been shown and described with certain embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for receiving multi-path signals in a communication system, the method comprising steps of:
    calculating a fast path correlation value from a first path signal being faster than an allocated multi-path signal;
    calculating a slow path correlation value from a second path signal being slower than the allocated multi-path signal;
    obtaining information regarding timing of the allocated multi-path signal by using the fast path correlation value and the slow path correlation value; and
    receiving the allocated multi-path signal based on the obtained timing information;
    wherein the step of calculating the fast path correlation value comprises steps of:
    finding a first correlation value, the first correlation value being obtained through correlation between a predetermined signal and the first path signal;
    finding a third correlation value, the third correlation value being obtained through correlation between the predetermined signal and a third path signal, the third path signal being faster than the first path signal; and
    subtracting the third correlation value from the first correlation value;
    wherein the step of calculating the slow path correlation value comprises steps of:
    finding a second correlation value, the second correlation value being obtained through correlation between the predetermined signal and the second path signal;
    finding a fourth correlation value, the fourth correlation value being obtained through correlation between the predetermined signal and a fourth path signal, the fourth oath signal being slower than the second path signal; and
    subtracting the fourth correlation value from the second correlation value.

2. The method as claimed in claim 1, wherein, in the step of finding the third correlation value, the third correlation value is found by applying a predetermined scaling value to a correlation value, the correlation value being obtained through correlation between the third path signal and the predetermined signal.

3. The method as claimed in claim 1, wherein the predetermined signal comprises a scrambling code having been used by a transmitter.

4. The method as claimed in claim 1, wherein the step of obtaining the timing information comprises a step of calculating a correlation value difference between the fast path correlation value and the slow path correlation value, loop-filtering the correlation value difference, and outputting a timing correction signal for correcting the timing of the allocated multi-path signal.

5. The method as claimed in claim 1, wherein the first path signal is faster than the allocated multi-path signal by ½ chip, and the second path signal is slower than the allocated multi-path signal by ½ chip.

6. The method as claimed in claim 1, wherein the third path signal is faster than the allocated multi-path signal by one chip, and the second path signal is slower than the allocated multi-path signal by one chip.

7. An apparatus for receiving multi-path signals in a communication system, the apparatus comprising:
    a fast path correlation value detector for calculating a fast path correlation value from a first path signal being faster than an allocated multi-path signal;
    a slow path correlation value detector for calculating a slow path correlation value from a second path signal being slower than the allocated multi-path signal; and
    a timing information generator for obtaining information regarding timing of the allocated multi-path signal by using the fast path correlation value and the slow path correlation value;
    wherein the fast path correlation value detector comprises:
    a first correlator for finding a first correlation value, the first correlation value being obtained through correlation between a predetermined signal and the first path signal;
    a third correlator for finding a third correlation value, the third correlation value being obtained through correlation between the predetermined signal and a third path signal, the third path signal being faster than the first path signal; and a first subtractor for calculating the fast path correlation value by subtracting the third correlation value from the first correlation value;

wherein the slow oath correlation value detector comprises:

a second correlator for finding a second correlation value, the second correlation value being obtained through correlation between the predetermined signal and the second path signal;

a fourth correlator for finding a fourth correlation value, the fourth correlation value being obtained through correlation between the predetermined signal and a fourth path signal, the fourth path signal being slower than the second path signal: and a second subtractor for calculating the slow path correlation value by subtracting the fourth correlation value from the second correlation value.

8. The apparatus as claimed in claim 7, wherein the third correlator finds the third correlation value by applying a predetermined scaling value to a correlation value, the correlation value being obtained through correlation between the third path signal and the predetermined signal.

9. The apparatus as claimed in claim 7, wherein the predetermined signal comprises a scrambling code having been used by a transmitter.

10. The apparatus as claimed in claim 7, wherein the timing information generator comprises:

a subtractor for calculating a correlation value difference between the fast path correlation value and the slow path correlation value; and a loop filter for filtering the correlation value difference and outputting a timing correction signal.

11. The apparatus as claimed in claim 7, wherein the first path signal is faster than the allocated multi-path signal by ½ chip, and the second path signal is slower than the allocated multi-path signal by ½ chip.

12. The apparatus as claimed in claim 7, wherein the third path signal is faster than the allocated multi-path signal by one chip, and the second path signal is slower than the allocated multi-path signal by one chip.

* * * * *

UNITED STATES PATENT AND TRADEMARK OFFICE
CERTIFICATE OF CORRECTION

PATENT NO. : 7,586,975 B2 Page 1 of 1
APPLICATION NO. : 11/148171
DATED : September 8, 2009
INVENTOR(S) : Ryu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1125 days.

Signed and Sealed this

Twenty-first Day of September, 2010

David J. Kappos
*Director of the United States Patent and Trademark Office*